(12) United States Patent  (10) Patent No.: US 8,330,806 B2
Yun et al.  (45) Date of Patent: Dec. 11, 2012

(54) STEREOSCOPIC IMAGE CONVERSION PANEL AND STEREOSCOPIC IMAGE DISPLAY APPARATUS HAVING THE SAME

(75) Inventors: Hae-Young Yun, Suwon-si (KR); Jae-Ik Lim, Seoul (KR); Seung-Kyu Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 1521 days.

(21) Appl. No.: 11/674,551

(22) Filed: Feb. 13, 2007

(65) Prior Publication Data

US 2007/0195409 A1    Aug. 23, 2007

(30) Foreign Application Priority Data

Feb. 17, 2006    (KR) .................. 10-2006-0015527

(51) Int. Cl.
  *H04N 13/04* (2006.01)
(52) U.S. Cl. ............................. 348/59; 348/51
(58) Field of Classification Search .................. None
  See application file for complete search history.

(56) References Cited

U.S. PATENT DOCUMENTS

| | | | |
|---|---|---|---|
| 5,877,876 A | | 3/1999 | Birdwell |
| 2004/0164927 A1 * | | 8/2004 | Suyama et al. ............... 345/32 |
| 2005/0111100 A1 * | | 5/2005 | Mather et al. ............... 359/464 |

FOREIGN PATENT DOCUMENTS

| | | |
|---|---|---|
| JP | 05-142511 | 6/1993 |
| JP | 09-258271 A | 10/1997 |
| JP | 10-48597 | 2/1998 |
| JP | 2002-010298 A | 1/2002 |
| KR | 1999-0053445 | 7/1999 |

OTHER PUBLICATIONS

English Language Abstract, Korean Patent Publication No. 1999-53445, 1 p.

* cited by examiner

*Primary Examiner* — John B. Walsh
(74) *Attorney, Agent, or Firm* — Innovation Counsel LLP

(57) ABSTRACT

In a stereoscopic image conversion panel and a stereoscopic image display apparatus, the stereoscopic display panel includes a first lens substrate, a second lens substrate, a stereoscopic image lens part and a lens liquid crystal layer. The stereoscopic image lens part is disposed between the first and second substrates, and includes a main lens and sub-lenses with a concave shape. At least one sub-lens is disposed at opposite edge portions of the main lens. The lens liquid crystal layer is received by the main lens and the sub-lenses, is disposed between the first and second lens substrates, and includes liquid crystal molecules having an anisotropic refractive index. The lens liquid crystal layer refracts a polarized light at an interface between the lens liquid crystal layer and the stereoscopic lens part, to convert a flat image into a stereoscopic image. Therefore, the thickness of the stereoscopic image panel can be reduced.

20 Claims, 12 Drawing Sheets

STEREOSCOPIC IMAGE CONVERSION PANEL AND STEREOSCOPIC IMAGE DISPLAY APPARATUS HAVING THE SAME

The present application claims priority under 35 USC §119 to Korean Patent Application No. 2006-15527, filed on Feb. 17, 2006, the contents of which are herein incorporated by reference in their entirety.

BACKGROUND OF THE INVENTION

1. Field of the Invention

The present invention relates to a stereoscopic image conversion panel and a stereoscopic image display apparatus having the stereoscopic image conversion panel.

2. Description of the Related Art

Recently, a stereoscopic image display apparatus capable of displaying a 3-D stereoscopic image has been developed, in response to increasing demand for 3-D stereoscopic images in applications such as games, movies, and so on.

Generally, a stereoscopic image display apparatus displays two different 2-D flat images so that each of the user's eyes receives a slightly different view. As a result, the user perceives a 3-D stereoscopic image. For example, a user may view a pair of 2-D flat images, which the user's brain synthesizes so that a stereoscopic image is perceived.

Stereoscopic image display apparatus types are divided into stereoscopic and auto stereoscopic apparatus, depending on whether or not the viewer wears special glasses. Stereoscopic displays include a polarizing type, a time divisional type, and so on. Auto stereoscopic displays include a parallax-barrier type, a lenticular type, a blinking light type, and so on.

Among the above display types, the lenticular type stereoscopic image display apparatus includes a backlight assembly that emits light, a display panel that displays a flat image using the light, a stereoscopic image conversion panel selectively converting the flat image into the stereoscopic image, and a switching panel selectively displaying one of the flat images and the stereoscopic image. For this type of display, the stereoscopic image conversion panel includes a lenticular lens that selectively refracts light that is polarized to have a predetermined direction, to convert the flat image into the stereoscopic image.

In a lenticular type stereoscopic image display apparatus, the stereoscopic image conversion panel generally includes concave lenses having a hemispheric shape. Liquid crystal molecules are arranged in a receiving space formed by the concave lenses. The concave lenses with the liquid crystal molecules in the receiving space refract the light that is polarized to have the predetermined direction, converting the flat image into the stereoscopic image.

However, since the stereoscopic image conversion panel includes concave lenses with a hemispheric shape, the thickness of the stereoscopic image conversion panel is relatively large. In addition, because of the hemispheric shape of the concave lenses, the number of liquid crystal molecules received in the concave lenses is also relatively large.

BRIEF SUMMARY OF THE INVENTION

Embodiments of the present invention provide a stereoscopic image conversion panel having a modified concave lens shape to reduce the thickness of the stereoscopic image conversion panel.

Embodiments of the present invention also provide a stereoscopic image display apparatus having the stereoscopic image conversion panel.

In an example stereoscopic image conversion panel according to the present invention, the stereoscopic image conversion panel includes a first lens substrate, a second lens substrate, a stereoscopic image lens part and a lens liquid crystal layer.

The second lens substrate faces the first lens substrate. The stereoscopic image lens part is disposed between the first and second substrates, and has a main lens and sub-lenses with a concave shape. At least one sub-lens is disposed at a first edge portion of the main lens, and at least one sub-lens is disposed at a second edge portion of the main lens opposite the first edge portion. The lens liquid crystal layer is received by the main lens and the sub-lenses, is disposed between the first and second lens substrates, and includes liquid crystal molecules having an anisotropic refractive index. The lens liquid crystal layer is configured to refract polarized light at an interface between the lens liquid crystal layer and the stereoscopic lens part, to generate a stereoscopic image based on a received flat image.

A longitudinal cross-sectional surface of the main lens has a concave part-elliptical shape, and that of the sub-lens has a concave saw-like shape including a curved portion and a substantially straight portion.

In another example stereoscopic image display apparatus according to the present invention, a stereoscopic image display apparatus includes a backlight assembly to emit light, a display panel assembly positioned to receive light from the backlight assembly and configured to generate light indicative of a flat image using the light, and a stereoscopic image conversion panel disposed over the display panel assembly.

The stereoscopic image conversion panel includes a first lens substrate, a second lens substrate facing the first lens substrate, a stereoscopic image lens part positioned between the first and second substrates, and having a concave main lens and concave sub-lenses. At least one sub-lens is positioned proximate a first edge portion of the main lens, and at least one sub-lens is positioned proximate a second edge portion of the main lens opposite the first edge portion. The stereoscopic image lens part further includes a lens liquid crystal layer received by the main lens and the sub-lenses, which is positioned between the first and second lens substrates, and includes liquid crystal molecules having an anisotropic refractive index, The lens liquid crystal layer is configured to refract polarized light at an interface between the lens liquid crystal layer and the stereoscopic lens part, to selectively modify light indicative of a flat image to generate light indicative of a stereoscopic image.

Therefore, since the stereoscopic image lens part includes the main lens and sub-lenses with reduced thickness compared to a conventional concave lens, the thickness of the stereoscopic image panel can be reduced, and thus the thickness of the stereoscopic image display apparatus can be reduced.

BRIEF DESCRIPTION OF THE DRAWINGS

The above and other features and advantages of the present invention will become more apparent by describing in detailed example embodiments thereof with reference to the accompanying drawings, in which.

DESCRIPTION OF THE EMBODIMENTS

Figure 1:
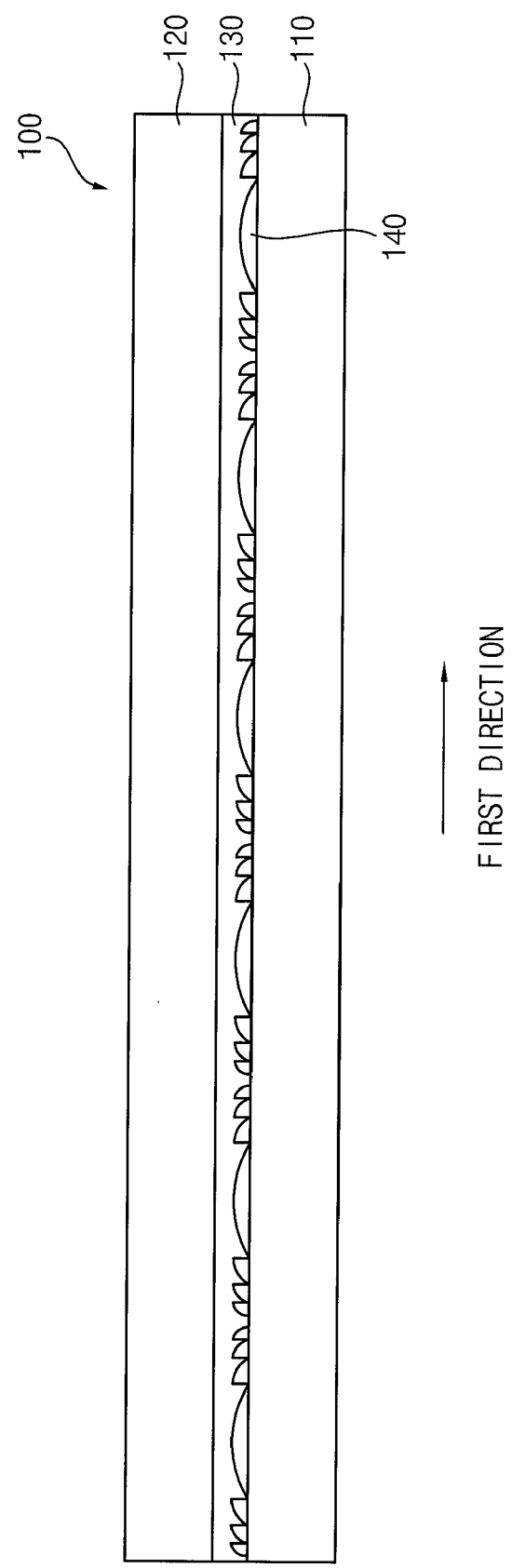
FIG. 1 is a cross-sectional view illustrating a stereoscopic image conversion panel according to a first example embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully describe the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The description of an element as "first" does not imply that second or other elements are needed.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result of, for example, manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Example Embodiment 1

<Stereoscopic Image Conversion Panel>

FIG. 1 is a cross-sectional view illustrating a stereoscopic image conversion panel according to a first example embodiment of the present invention.

Referring to FIG. 1, the stereoscopic image conversion panel 100 according to the present example embodiment includes a first lens substrate 110, a second lens substrate 120, a stereoscopic image lens part 130 and a lens liquid crystal layer 140. The stereoscopic image conversion panel 100 converts light indicative of a flat image into light indicative of a stereoscopic image, and emits the stereoscopic image.

In the illustrated embodiment, the first and second lens substrates 110 and 120 have a plate-like shape, and may include, for example transparent glass, quartz, or a synthetic resin. The second lens substrate 120 faces the first lens substrate 110.

The stereoscopic image lens part 130 is disposed between the first and second lens substrates 110 and 120. The stereoscopic lens part 130 includes a plurality of unit lenses disposed along a first direction. For example, the unit lenses may have a concave shape. Some embodiments of a stereoscopic image lens part 130 having concave unit lenses are described in, more detail below, with reference to additional figures.

The lens liquid crystal layer 140 is received by the unit lenses of the stereoscopic image lens part 130 and is disposed between the first and second lens substrates 110 and 120. The lens liquid crystal layer 140 includes liquid crystal molecules. Each liquid crystal molecule has a shape that is elongated along one direction (like a long granule), which is referred to as the longitudinal direction. The liquid crystal molecules have an anisotropic refractive index, which is a refractive index changing according to an incident direction of a light. For example, the liquid crystal molecules have a first refractive index with respect to one direction, and have a second different refractive index with respect to a direction perpendicular to that direction. For example, the first refractive index may be about 1.8, and the second refractive index may be about 1.5.

Figure 2:
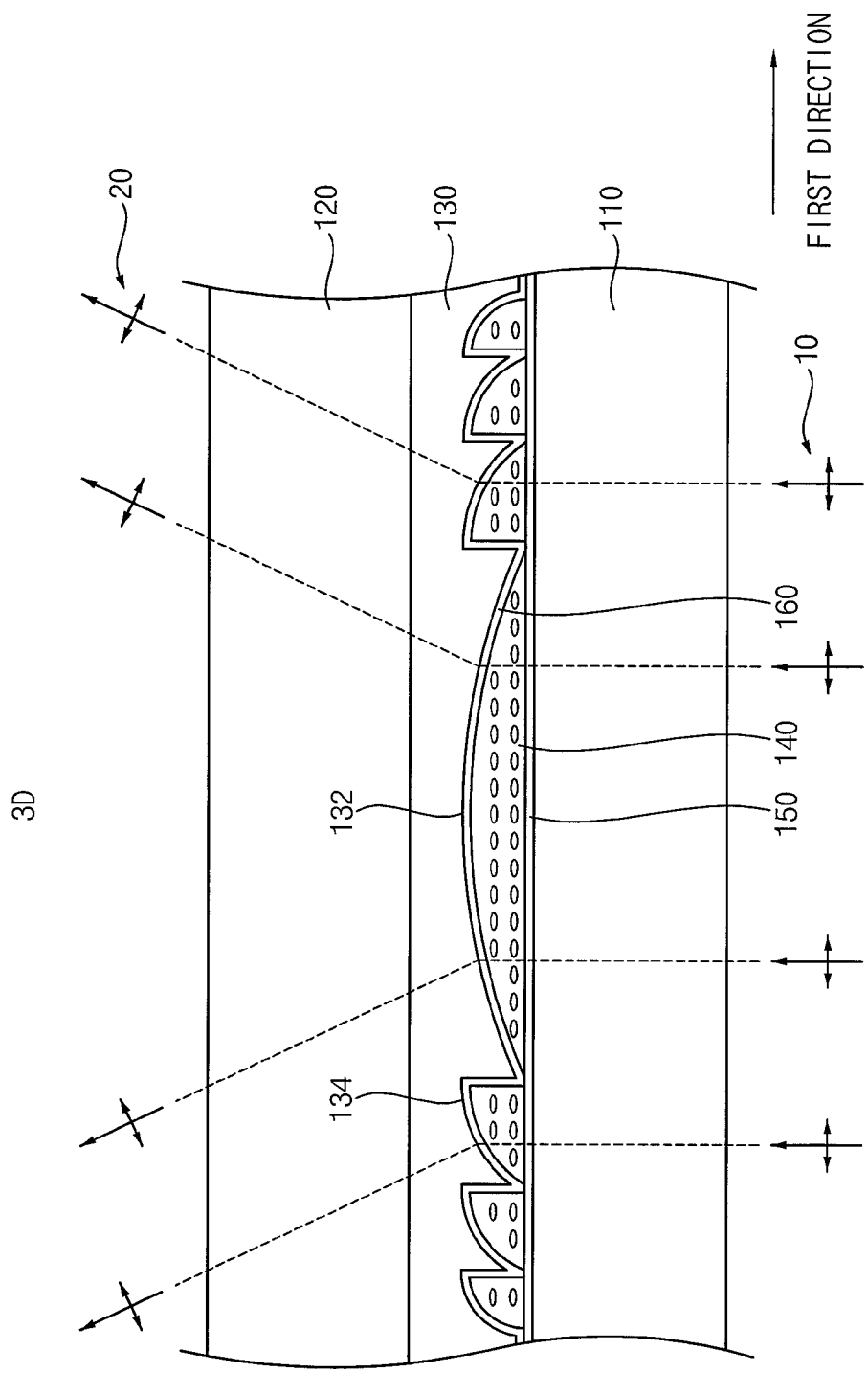
FIG. 2 is a partially enlarged sectional view illustrating the stereoscopic image conversion panel in FIG. 1.
Figure 3:
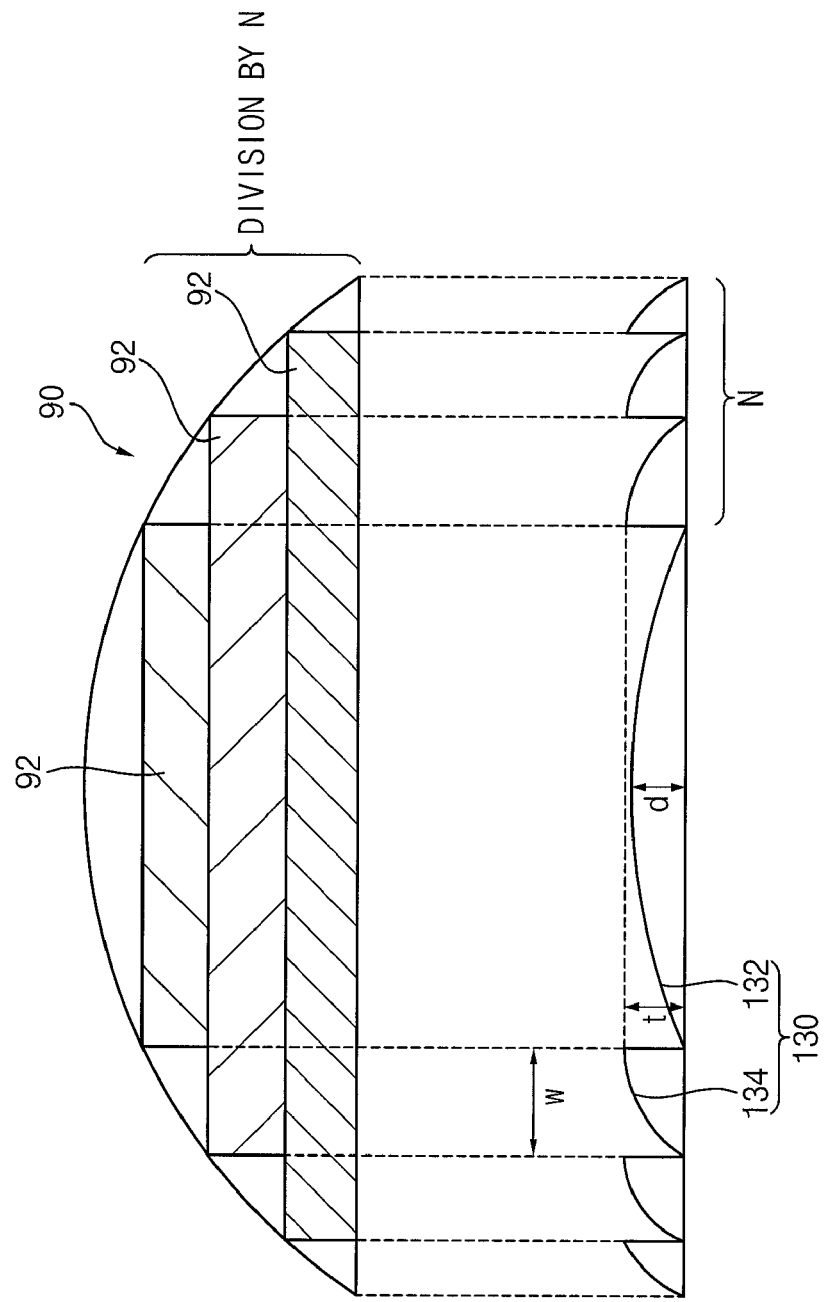
FIG. 3 is a cross-sectional view illustrating formation of the stereoscopic image lens part in FIG. 2.

FIG. 2 is a partially enlarged sectional view illustrating the stereoscopic image conversion panel in FIG. 1, and FIG. 3 is a conceptual cross-sectional view explaining a method of forming the stereoscopic image lens part in FIG. 2.

Referring to FIGS. 2 and 3, the stereoscopic image lens part 130 according to the present example embodiment is disposed between the first and second lens substrates 110 and 120, and includes a plurality of unit lenses disposed along the first direction. Each of the unit lenses includes a main lens 132 and sub-lenses 134. At least one sub-lens 134 is disposed at each of the edges of the main lens 132 along the first direction; for example, one sub-lens 134 is disposed proximate a first edge portion of main lens 132 while another sub-lens 134 is disposed proximate a second edge portion of main lens 132 opposite the first edge portion along the first direction. In some embodiments, each unit lens has a Fresnel lens structure.

With regard to a longitudinal cross-sectional surface, the longitudinal cross-sectional surface of the main lens 132 has a concave part-elliptical shape (an elliptical segment), and that of sub-lens 134 has a concave saw-like shape including a curved portion and a substantially straight portion. In this case, the longitudinal cross-sectional surface is defined as a cross-sectional surface taken along the first direction. The liquid crystal molecules of the lens liquid crystal layer 140 are arranged in a receiving space that is formed by the main lens 132 and the sub-lenses 134.

With regard to an arrangement of the main lens 132 and the sub-lenses 134, at least one sub-lens 134 is disposed along the first direction at each of edge of the main lens 132. The sub-lenses 134 have a symmetric shape with respect to the main lens 132. In some embodiments, three or four sub-lenses 134 are preferably disposed proximate a first edge portion of the main lens 132, while the same number of sub-lenses 134 are disposed proximate the second edge portion.

With regard to a shape, a height and width, the main lens 132 has an elongated shape extending along a second direction perpendicular to the first direction (i.e., into/out of the page of FIG. 2), and the sub-lenses 134 also have an elongated shape extending along the second direction.

In some embodiments, all the sub-lenses 134 have a substantially equal first height t, for example in the range from about 1 µm and about 20 µm. The first height t of the sub-lenses 134 is preferably about 13 µm. A second height d of the main lens 132 is preferably less than or the same as the first height t of the sub-lenses 134. The width w of the sub-lenses 134 decreases as distance between the sub-lenses 134 and the main lens 132 increases.

Referring to FIG. 3 again, formation of the main lens 132 and the sub-lenses 134 will be explained as follows.

First, a primitive lens 90 that includes a longitudinal cross-sectional surface having a circular segment or an elliptical segment shape is prepared. Rectangular sections 92 having a same height are removed from the primitive lens 90. The inside of the primitive lens 90 is divided by N (N: natural number), and thus one divisional portion has a rectangular shape that corresponds to each rectangular section 92. Each rectangular section 92 has the same height t as that of the sub-lens 134. The inside of the primitive lens 90 is preferably divided by three or four. After the rectangular sections 92 are removed, the primitive lens 90 (without the rectangular sections 92) is flattened, forming the main lens 132 and the sub-lenses 134.

Referring to FIG. 2 again, the stereoscopic image conversion panel 100 may further include a first alignment film 150 and a second alignment film 160.

The first alignment film 150 is formed on the first lens substrate 110 facing the stereoscopic image lens part 130. The second alignment film 160 is formed on the stereoscopic image lens part 130 facing the first alignment film 150; that is, on the surface that receives liquid crystal layer 140. For example, the second alignment film 160 is formed on an outer surface of the main lens 132 and the sub-lenses 134. In this case, the liquid crystal molecules of the lens liquid crystal layer 140 are disposed between the first and second alignment films 150 and 160.

In the absence of an applied electric field, the liquid crystal molecules of the lens liquid crystal layer 140 are arranged based on an interaction with the first and second alignment films 150 and 160. Particularly, a longitudinal arrangement direction of liquid crystal molecules of the lens liquid crystal layer 140 is parallel to the first and second lens substrates 110 and 120 due to the interaction with the first and second alignment films 150 and 160, and the longitudinal arrangement direction is preferably parallel to the first direction.

When first light 10 polarized in the first direction enters the stereoscopic image conversion panel 100, the first light 10 interacts with materials having different refractive indices, including a first refractive index of the lens liquid crystal layer 140 arranged parallel to the first direction and a second refractive index of the stereoscopic image lens part 130. Particularly, the first refractive index of lens liquid crystal layer 140 is larger than the second refractive index of the stereoscopic image lens part 130. For example, the first refractive index may be about 1.8, and the second refractive index may be about 1.5.

Therefore, when the first light 10 polarized to have the first direction enters into the stereoscopic image conversion panel 100, the first light 10 is refracted into a predetermined angle at an interface between the lens liquid crystal layer 140 and the stereoscopic image lens part 130 (which have different refractive indices from one another). For example, when the first light 10 embodying the flat image enters into the stereoscopic image conversion panel 100, the first light 10 is converted into second image light 20 embodying the stereoscopic image.

According to the present example embodiment, the stereoscopic image lens part 130 includes the main lens 132 and the sub-lenses 134. The thickness of main lens 132 and sub-lenses 134 is less than the thickness of conventional primitive lens 90, so that the thickness of the stereoscopic image lens part 130 can be reduced. Therefore, the thickness of the stereoscopic image conversion panel 100 can be reduced.

In addition, because the thickness of the stereoscopic image lens part 130 including the main lens 132 and the sub-lenses 134 is reduced, the number of liquid crystal molecules received by the main lens 132 and the sub-lenses 134 can be reduced as well.

Furthermore, the main lens 132 and the sub-lenses 134 of the stereoscopic image lens part 130 have a more flattened surface, so that an alignment groove can be more easily formed on the second alignment film 160 of the stereoscopic image lens part 130, using a rubbing process.

Example Embodiment 2

<Stereoscopic Image Conversion Panel>

Figure 4:
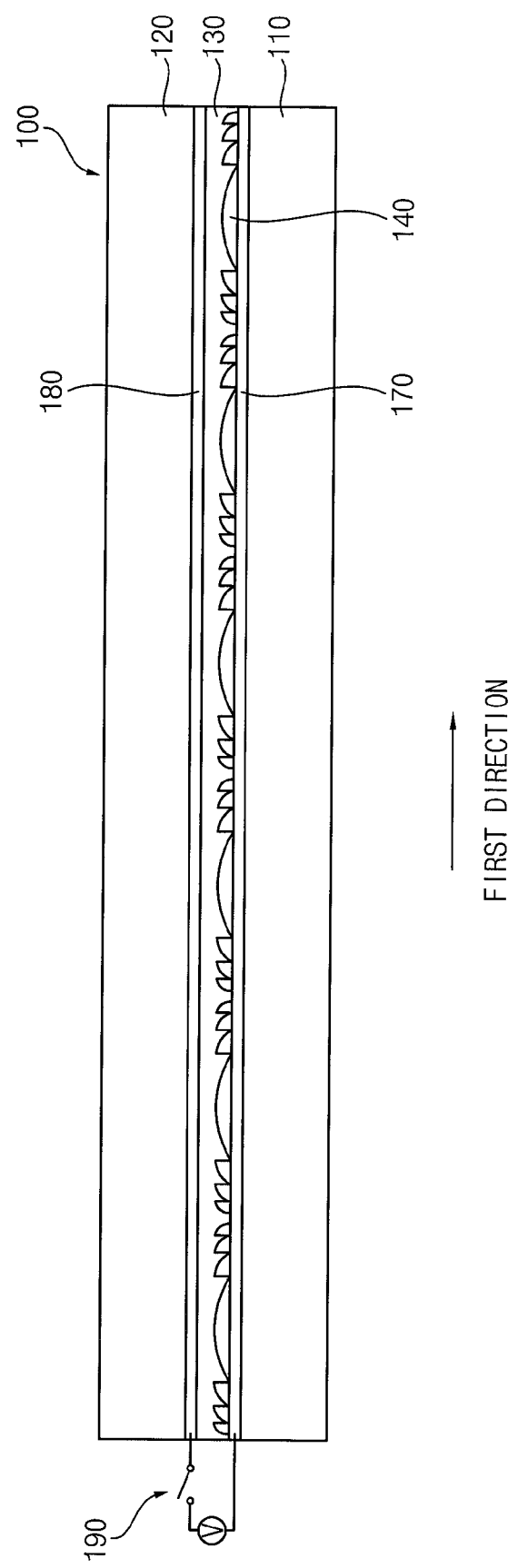
FIG. 4 is a cross-sectional view illustrating a stereoscopic image conversion panel according to a second example embodiment of the present invention.
Figure 5:
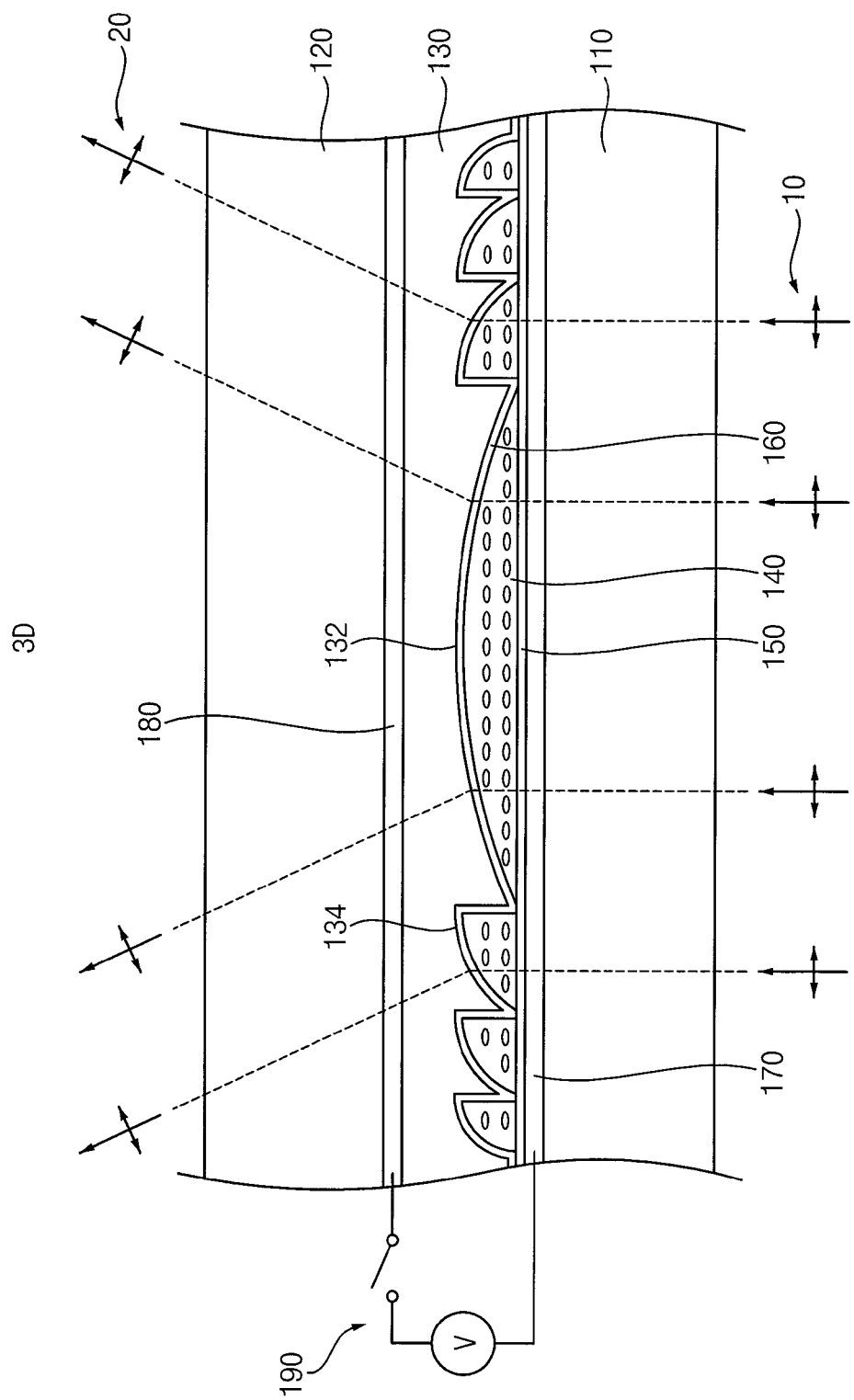
FIG. 5 is a partially enlarged sectional view illustrating the stereoscopic image conversion panel in FIG. 4.
Figure 6:
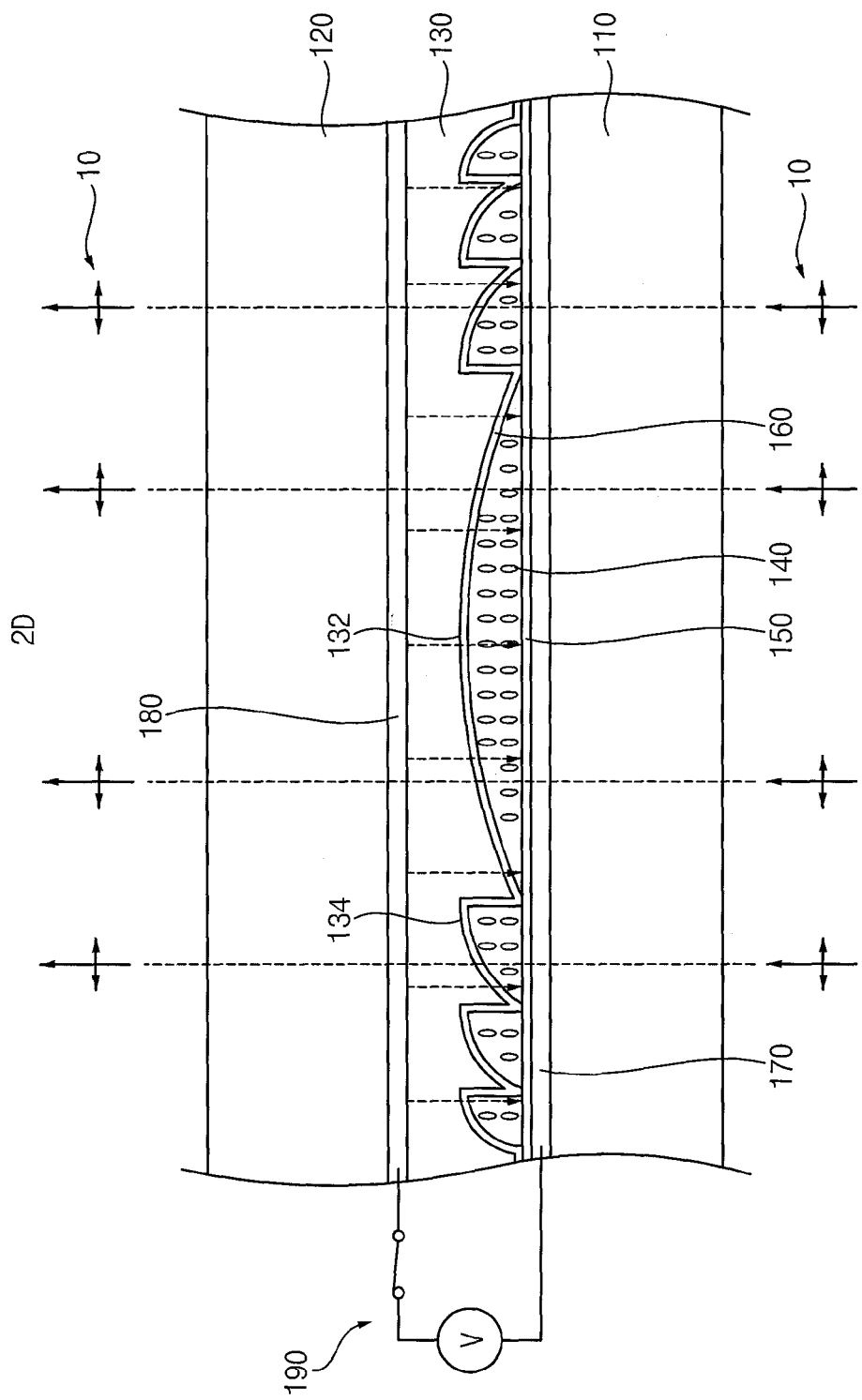
FIG. 6 is a cross-sectional view illustrating an electric field generated in the stereoscopic image conversion panel.

FIG. 4 is a cross-sectional view illustrating a stereoscopic image conversion panel according to a second example embodiment of the present invention, FIG. 5 is a partially enlarged sectional view illustrating the stereoscopic image conversion panel in FIG. 4, and FIG. 6 is a cross-sectional view illustrating an electric field generated in the stereoscopic image conversion panel based on an applied potential difference.

The stereoscopic image conversion panel of the present example embodiment is the same as in Example Embodiment 1 except for the addition of a first transparent electrode, a second electrode, and a power supply part. Thus, the same reference numerals will be used to refer to the same or like parts as those described in Example Embodiment 1, and further repetitive explanation concerning the above elements may be omitted Referring to FIGS. 4, 5 and 6, the stereoscopic image conversion panel 100 according to the present example embodiment includes a first lens substrate 110, a second lens substrate 120, a stereoscopic image lens part 130, a lens liquid crystal layer 140, a first alignment film 150, a second alignment film 160, a first transparent electrode 170, a second transparent electrode 180, and a power supply part 190. The first transparent electrode 170 is formed on the first lens substrate 110 facing the stereoscopic image lens part 130. The first transparent electrode 170 includes a transparent conductive material. Examples of a material that can be used for the first transparent electrode 170 may include indium tin oxide (ITO), indium zinc oxide (IZO), amorphous indium tin oxide (a-ITO), and so on. The first transparent electrode 170 is electrically connected to the power supply part 190. A first voltage is applied to the first transparent electrode 170.

The second transparent electrode 180 is formed on the second lens substrate 120 facing the stereoscopic image lens part 130. In some embodiments, the second transparent electrode 180 includes the same transparent conductive material as the first transparent electrode 170. The second transparent electrode 180 is electrically connected to the power supply part 190. A second voltage different from the first voltage is applied to the second transparent electrode 180, so that there is an applied potential difference between first transparent electrode 170 and second transparent electrode 180.

The power supply part 190 is electrically connected to the first and second electrodes 170 and 180, respectively. In the illustrated configuration, when the switch is in the on position, the power supply part 190 applies the first voltage to the first transparent electrode 170 and applies the second voltage to the second transparent electrode 180.

In response to the application of the first voltage to the first transparent electrode 170 and the application of the second voltage to the second transparent electrode 180, an electric field is generated between the first and second transparent electrodes 170 and 180. The electric field changes the arrangement of the liquid crystal molecules received by the stereoscopic image lens part 130.

The arrangement of the liquid crystal molecules of the lens liquid crystal layer 140, when an electric field is generated or is not generated, will now be explained. A path of the incident light with respect to panel 100 will also be explained.

Referring to FIG. 5, when an electric field is not generated between the first and second transparent electrodes 170 and 180, a longitudinal arrangement direction of liquid crystal molecules of the lens liquid crystal layer 140 is parallel to the first and second lens substrates 110 and 120 due to the first and second alignment films 150 and 160. In the illustrated example, the longitudinal arrangement direction of liquid crystal molecules of the lens liquid crystal layer 140 is parallel to the first direction. In this case, the liquid crystal molecules of the lens liquid crystal layer 140 may be twisted into 90 degrees up to an upper portion.

Thus, when the longitudinal arrangement direction of liquid crystal molecules of the lens liquid crystal layer 140 is parallel to the first direction, the first light 10 that has been polarized to have the first direction is refracted into a predetermined angle at an interface between the lens liquid crystal layer 140 and the stereoscopic image lens part 130. For example, the first light 10 embodying the flat image enters into and passes through the stereoscopic image conversion panel 100, so that the first light 10 is converted into the second image light 20 for displaying the stereoscopic image.

However, referring to FIG. 6, when the electric field is generated between the first and second transparent electrodes 170 and 180, the longitudinal arrangement direction of liquid crystal molecules of the lens liquid crystal layer 140 is perpendicular to the first and second lens substrates 110 and 120 (vertical on the page).

Thus, when the longitudinal arrangement direction of liquid crystal molecules of the lens liquid crystal layer 140 is perpendicular to the first and second lens substrates 110 and 120, the first light 10 that has been polarized to have the first direction is incident on an interface between the lens liquid crystal layer 140 and the stereoscopic image lens part 130. Lens liquid crystal layer 140 has the first refractive index, while the stereoscopic image lens part 130 has the second refractive index, which is substantially the same as the first refractive index. As a result, the first light 10 that has been polarized to have the first direction is not refracted on the interface between the lens liquid crystal layer 140 and the stereoscopic image lens part 130. The light passes through the interface, so that the first light 10 displays the flat image.

To summarize the above, when the electric field is not generated, the longitudinal arrangement direction of liquid crystal molecules is parallel to the first and second lens substrates 110 and 120. When the electric field is generated, the longitudinal arrangement direction of liquid crystal molecules is in perpendicular to the first and second lens substrates 110 and 120.

However, in some embodiments, the longitudinal arrangement direction of liquid crystal molecules may be perpendicular to the first and second lens substrates 110 and 120 due to an interaction with the first and second alignment layers 150 and 160 when the electric field is not generated. The longitudinal arrangement direction of liquid crystal molecules may be parallel to the first and second lens substrates 110 and 120, when the electric field is generated. A flat image may thus be generated in the absence of an applied potential difference, while a stereoscopic image is displayed when a potential difference is applied between first and second transparent electrodes 170 and 180.

According to the present example embodiment, the stereoscopic image lens part 130 includes the main lens 132 and the sub-lenses 134. The thickness of main lens 132 and sub-lenses 134 is less than the thickness of conventional primitive lens 90, so that the thickness of the stereoscopic image lens part 130 can be reduced. Additionally, the number of liquid crystal molecules received by the main lens 132 and the sub-lenses 134 can be reduced, and an alignment groove can be more easily formed on the second alignment film of the stereoscopic image lens part 130 using a rubbing process.

Furthermore, as the thickness of the stereoscopic image lens part 130 is reduced, a distance between the first and second transparent electrodes 170 and 180 is reduced. Therefore, a voltage (potential difference) applied between the first and second transparent electrodes 170 and 180 to generate a substantially constant electric field can be lowered. This can increase the response speed of the liquid crystal molecules based on a change in the electric field.

In particular, an intensity of the electric field generated between the first and second transparent electrodes 170 and 180 is directly proportional to the difference between the first and second voltages applied respectively to the first and second transparent electrodes 170 and 180 (for a given distance between first transparent electrode 170 and second transparent electrode 180). For a given potential difference, the intensity is inversely proportional to the distance between the first and second transparent electrodes 170 and 180. For example, as the distance between the first and second transparent electrodes 170 and 180 is decreased, the intensity of the electric field increases. Therefore, the voltage potential applied between the first and second transparent electrodes 170 and 180 can be lowered to generate a constant electric field having a particular intensity.

As the number of the liquid crystal molecules disposed between the first and second transparent electrodes 170 and 180 is reduced due to the reduction of the thickness of the stereoscopic image lens part 130, the response speed of the liquid crystal molecules based on a change in the electric field can be increased.

Example Embodiment 3

<Stereoscopic Image Conversion Panel>

Figure 7:
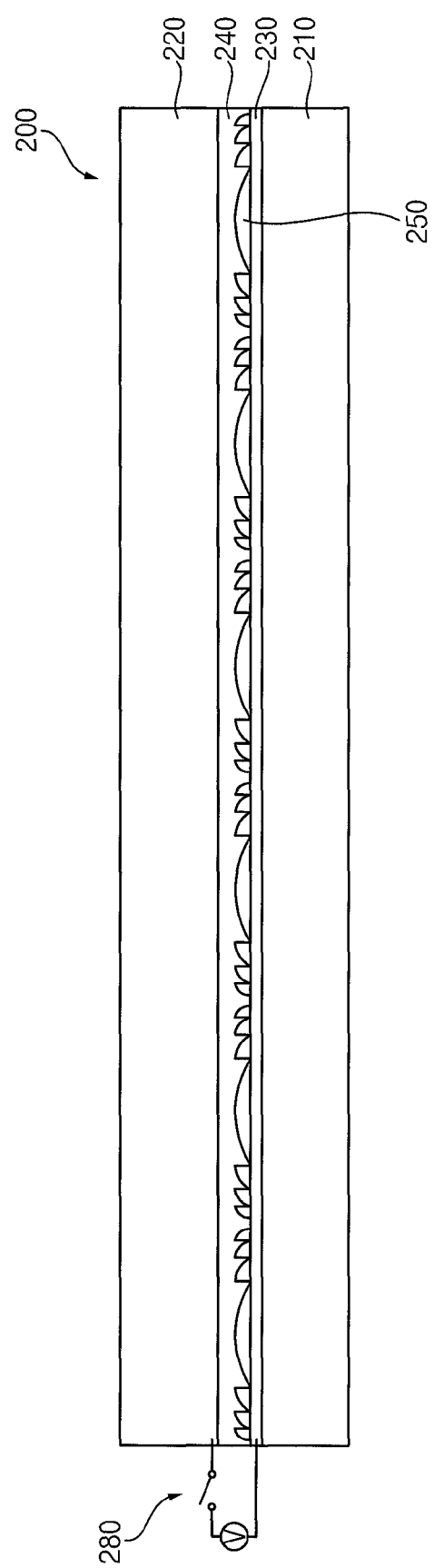
FIG. 7 is a cross-sectional view illustrating a stereoscopic image conversion panel according to a third example embodiment of the present invention.
Figure 8:
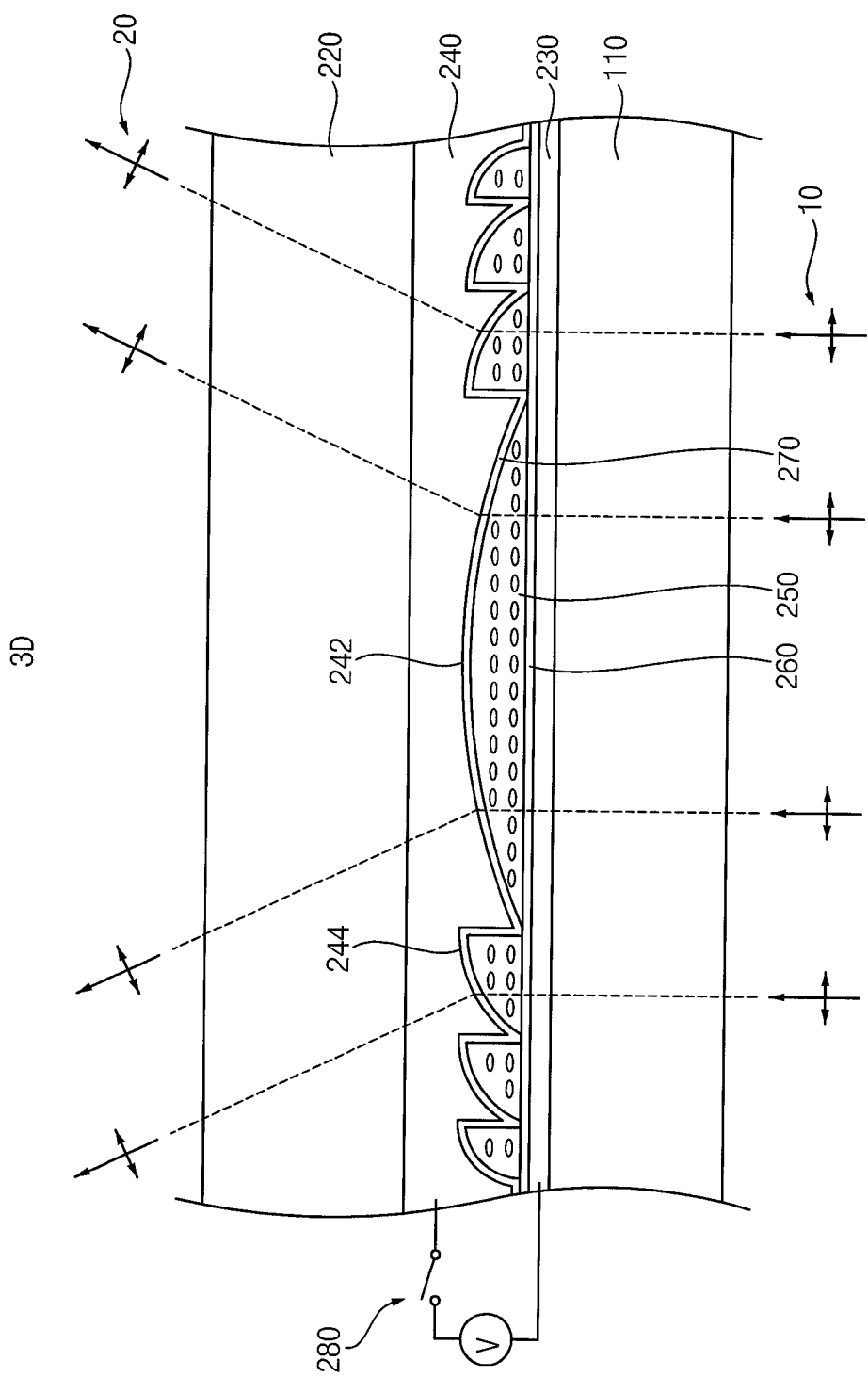
FIG. 8 is a partially enlarged sectional view illustrating the stereoscopic image conversion panel in FIG. 7.
Figure 9:
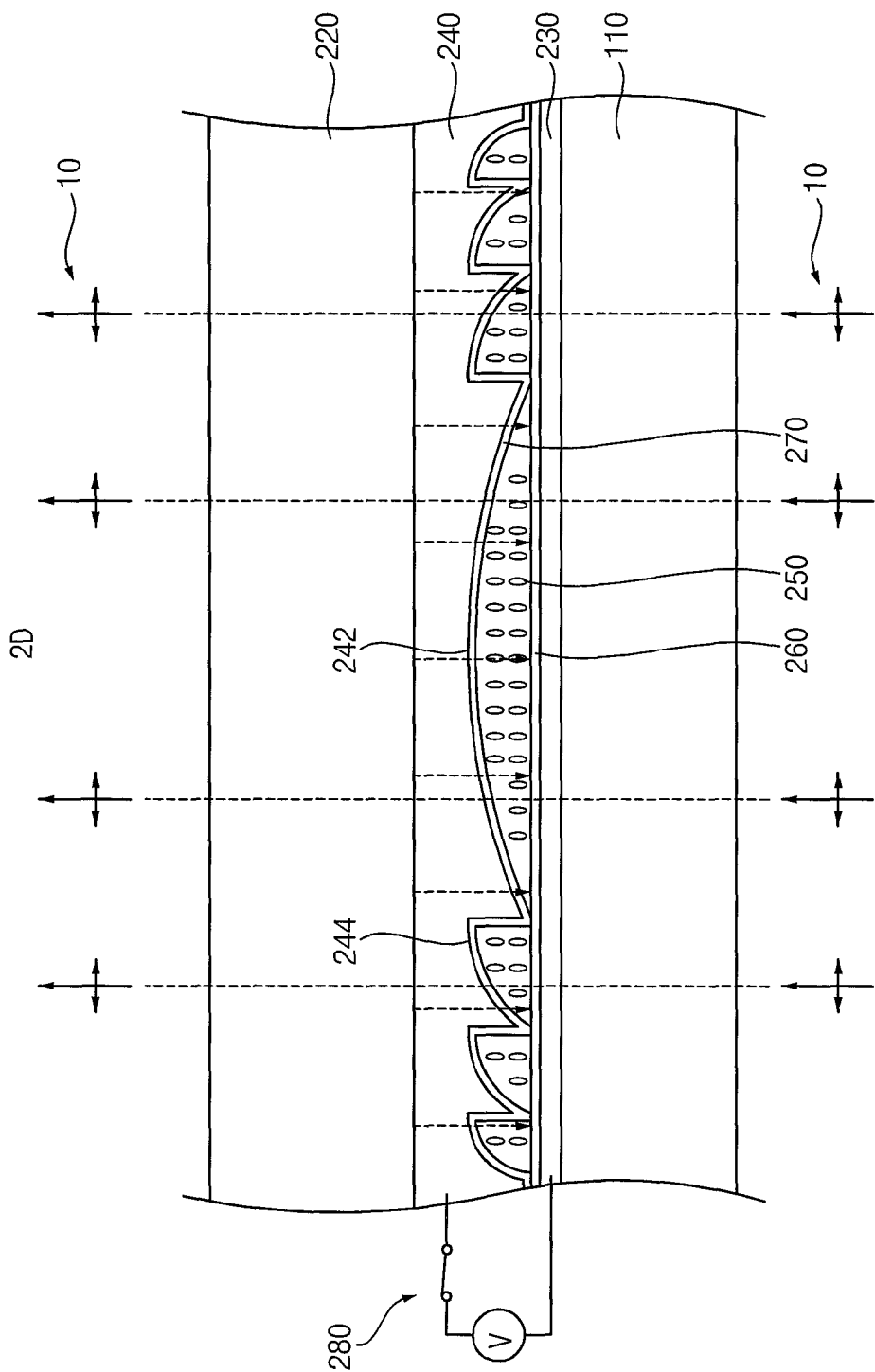
FIG. 9 is a cross-sectional view illustrating an electric field generated in the stereoscopic image conversion panel.

FIG. 7 is a cross-sectional view illustrating a stereoscopic image conversion panel according to a third example embodiment of the present invention, FIG. 8 is a partially enlarged sectional view illustrating the stereoscopic image conversion panel in FIG. 7, and FIG. 9 is a cross-sectional view illustrating an electric field generated in the stereoscopic image conversion panel in FIG. 8.

Referring to FIGS. 7, 8 and 9, the stereoscopic image conversion panel 200 according to the present example embodiment includes a first transparent substrate 210, a second transparent substrate 220, a transparent electrode 230, a stereoscopic image lens part 240, a lens liquid crystal layer 250, a first alignment film 260, a second alignment film 270, and a power supply part 280.

In the illustrated embodiment, the first and second transparent substrates 210 and 220 have a plate-like shape, include a transparent material, and are disposed to face one another.

The transparent electrode 230 is disposed on the first transparent substrate 210 facing the second transparent substrate 220. The transparent electrode 230 includes a transparent conductive material. Examples of a material that can be used for the transparent electrode 230 include indium tin oxide (ITO), indium zinc oxide (IZO), amorphous indium tin oxide (a-ITO), and so on. The transparent electrode 230 is electrically connected to the power supply part 280. A first voltage is applied to the transparent electrode 230.

The stereoscopic image lens part 240 is disposed between the transparent electrode 230 and the second transparent substrate 220. The stereoscopic image lens part 240 includes a plurality of unit lenses disposed along the first direction. Each of the unit lenses has a concave shape. Each of the unit lenses includes a main lens 242 and sub-lenses 244. At least one sub-lens 244 is disposed at each of a first edge portion and a second edge portion of the main lens 242, where the first and second edge portions are opposite each other along the first direction.

In this case, the longitudinal cross-sectional surface of the main lens 242 has a concave part-elliptical shape (an elliptical segment), and that of sub-lens 244 has a concave saw-like shape including a curved portion and a substantially straight portion. At least one sub-lens 244 is disposed along the first direction at each of the first and second edge portions of the main lens 242. The sub-lenses 244 have a symmetric shape with respect to the main lens 242. The main lens 242 has an elongated shape extending along the second direction perpendicular to the first direction, and the sub-lenses 244 also have an elongated shape extending along the second direction. All the sub-lenses 244 preferably have a height in the range extending from 1 μm and 20 μm. The height of the main lens 242 is preferably lower or the same as the height of the sub-lenses 244. The width of the sub-lenses 244 gets smaller as distance between the sub-lenses 244 and the main lens 242 increases.

The stereoscopic image lens part 240 includes a transparent conductive material, and preferably includes a conductive polymer. An example of a material that can be used for the stereoscopic image lens part 240 is a polymethyl methacrylate (PMMA). The stereoscopic image lens part 240 is electrically connected to the power supply part 280. A second voltage different from the first voltage is applied to the stereoscopic image lens part 240. Therefore, a potential difference between the transparent electrode 230 and the stereoscopic image lens part 240 is applied, so that an electric field is generated between the transparent electrode 230 and the stereoscopic image lens part 240.

The lens liquid crystal layer 250 is received by the main lens 242 and the sub-lenses 244, so that the lens liquid crystal layer 250 is disposed between the transparent electrode 230 and the stereoscopic image lens part 240. The lens liquid crystal layer 250 includes liquid crystal molecules. Each liquid crystal molecule has an elongated shape (like a long granule) along one direction. The liquid crystal molecules have an anisotropic refractive index, which is a refractive index changing according to an incident direction of incoming light.

The first alignment layer 260 is formed on the transparent electrode 230. The second alignment layer 270 is formed on the stereoscopic image lens part 240 facing the first alignment layer 260. When an electric field is not generated between the transparent electrode 230 and the stereoscopic image lens part 240, the liquid crystal molecules of the lens liquid crystal layer 250 are arranged longitudinally, as determined by the first and second alignment layers 260 and 270.

The longitudinal arrangement direction of the liquid crystal molecules of the lens liquid crystal layer 140 when the electric field is generated and is not generated will be explained below. A path of the incident light with respect to panel 200 will also be described.

Referring to FIG. 8, when the electric field is not generated between the transparent electrode 230 and the stereoscopic image lens part 240, the longitudinal arrangement direction of liquid crystal molecules of the lens liquid crystal layer 250 is parallel to the first direction with respect to the first and second lens substrates 210 and 220, due to the first and second alignment films 260 and 270. In this case, the liquid crystal molecules of the lens liquid crystal layer 250 may be twisted 90 degrees up to an upper portion.

Thus, when the longitudinal arrangement direction of liquid crystal molecules of the lens liquid crystal layer 250 is parallel to the first direction, the first light 10 that has been polarized to have the first direction is refracted into a predetermined angle at an interface between the lens liquid crystal layer 250 and the stereoscopic image lens part 240. Therefore, the first light 10 is converted into the second image light 20 to display the stereoscopic image.

However, referring to FIG. 9, when the electric field is generated between the transparent electrode 230 and the stereoscopic image lens part 240, the longitudinal arrangement direction of liquid crystal molecules of the lens liquid crystal layer 250 is perpendicular to the first and second lens substrates 210 and 220.

When the longitudinal arrangement direction of liquid crystal molecules of the lens liquid crystal layer 250 is perpendicular to the first and second lens substrates 210 and 220, the first light 10 that has been polarized to have the first direction is not refracted on the interface between the lens liquid crystal layer 250 and the stereoscopic image lens part 240, and just passes through the interface, so that the first light 10 displays the flat image.

However, in some embodiments, the longitudinal arrangement direction of liquid crystal molecules of the lens liquid crystal layer 250 may be perpendicular to the first and second lens substrates 210 and 220 by the first and second alignment layers 260 and 270 when the electric field is not generated. The longitudinal arrangement direction of liquid crystal molecules may be parallel to the first and second lens substrates 110 and 120 when the electric field is generated.

According to the present example embodiment, since the stereoscopic image lens part 240 includes the transparent conductive material, an electric field is generated between the transparent electrode 230 and the stereoscopic image lens part 240 in response to an applied voltage, so that the liquid crystal molecules of the lens liquid crystal layer 250 can be rearranged.

Example Embodiment 1

<Stereoscopic Image Display Apparatus>

Figure 10:
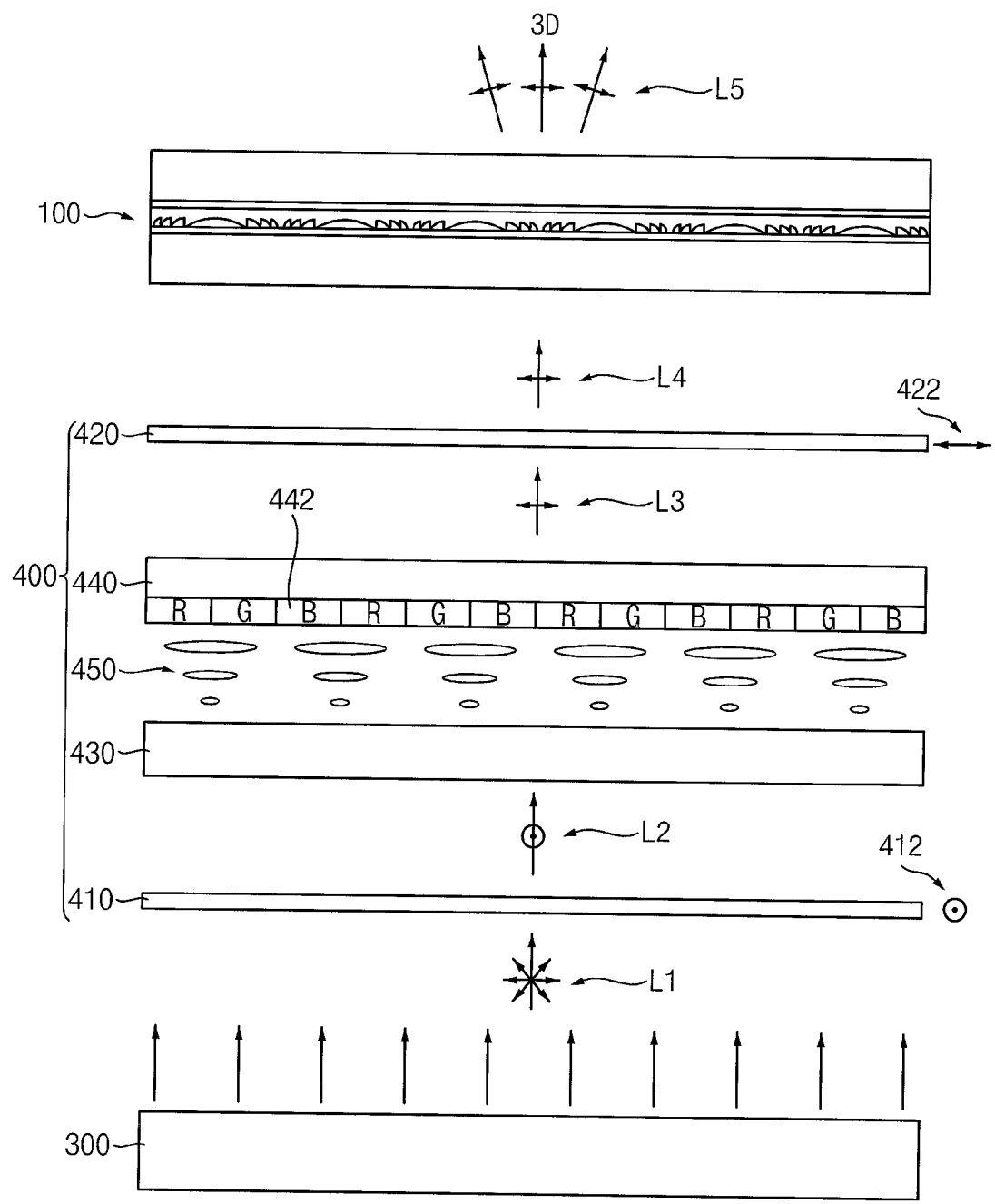
FIG. 10 is a cross-sectional view illustrating a stereoscopic image display apparatus according to a first example embodiment of the present invention.

FIG. 10 is a cross-sectional view illustrating a stereoscopic image display apparatus according to a first example embodiment of the present invention. The stereoscopic image conversion panel 100 in the stereoscopic image display apparatus of the present embodiment is the same as the stereoscopic image conversion panel in Example Embodiment 2 or Example Embodiment 3. Thus, the same reference numerals will be used to refer to the same or like parts as those described in Example Embodiment 2 or Example Embodiment 3 of the stereoscopic image conversion panel and further repetitive explanation concerning the above elements may be omitted Referring to FIG. 10, the stereoscopic image display apparatus according to the present example embodiment includes a backlight assembly 300, a display panel assembly 400 and a stereoscopic image conversion panel 100.

The backlight assembly 300 includes a light source (not shown) to emit first light L1. The display panel assembly 400 is disposed over the backlight assembly 300, to display a flat image using first light L1. The stereoscopic image conversion panel 100 is disposed over the display panel assembly 400, for selectively converting the flat image into a stereoscopic image, to output the stereoscopic image.

The display panel assembly 400 includes, for example, a first polarizing plate 410, a second polarizing plate 420, and a display panel. The display panel includes a first substrate 430, a second substrate 440 and a liquid crystal layer 450.

The first polarizing plate 410 has a first polarizing axis 412. The first polarizing plate 410 is disposed over the backlight assembly 300, for converting first light L1 into second light L2 polarized parallel to the first polarizing axis 412. The second polarizing plate 420 is disposed facing the first polarizing plate 410, and has a second polarizing axis 422 perpendicular to the first polarizing axis 412.

The first substrate 430 includes a transparent material, and is disposed between the first and second polarizing plates 410 and 420. The first substrate 430 includes a plurality of pixel electrodes (not shown) arranged in a matrix shape, a plurality of thin film transistors (not shown) to apply a driving voltage to each pixel electrode, and a plurality of signal lines to operate the thin film transistors.

The second substrate 440 is disposed between the first substrate 430 and the second polarizing plate 420 facing the first substrate 430. The second substrate 440 includes a common electrode and color filters 442. The common electrode, which is formed on the entire second substrate 440, is transparent and conductive. The color filters 442 are formed to face associated pixel electrodes. The color filters include, for example a red color filter (R), a green color filter (G), a blue color filter (B), and so on.

The liquid crystal layer 450 is disposed between the first and second substrates 430 and 440, and molecules of liquid crystal layer 450 are rearranged by an electric field generated between the pixel electrode and the common electrode. The rearranged liquid crystal layer 450 controls the transmissivity of light applied from an external source (such as backlight assembly 300). A particular image is displayed, when the light having a predetermined transmissivity passes through the color filters. In some embodiments, when the electric field is not generated, molecules of the liquid crystal layer 450 may be twisted into 90 degrees up to an upper portion.

In this case, when the electric field is not generated, the display panel assembly 400 is in normally white mode which displays a white image in the absence of an electric field in liquid crystal layer 450.

An embodiment of a process by which the stereoscopic image display apparatus selectively displays a stereoscopic image is as follows. First, first light L1 that has been emitted by the backlight assembly 300 passes through the first polarizing plate 410, and is converted into second light L2 with a polarization direction parallel to the first polarizing axis 412. The polarization direction of second light L2 is rotated by 90 degrees when passing through the liquid crystal layer 450 disposed between the first and second substrates 430 and 440, and converted into third light L3. Since third light L3 is polarized in the same direction as the second polarizing axis 450, third light L3 just passes through the second polarizing plate 420, and is converted into fourth light L4. In this case, fourth light L4 displays the flat image.

The fourth light L4 is refracted by or just passes through the stereoscopic image conversion panel 100, depending on selection of parameters to generate a stereoscopic image or a flat image. When fourth light L4 is refracted by the stereoscopic image conversion panel 100, fourth light L4 is converted into fifth light L5 embodying the stereoscopic image. However, when the fourth light L4 just passes through the stereoscopic image conversion panel 100, the fourth light embodies the flat image.

Figure 11:
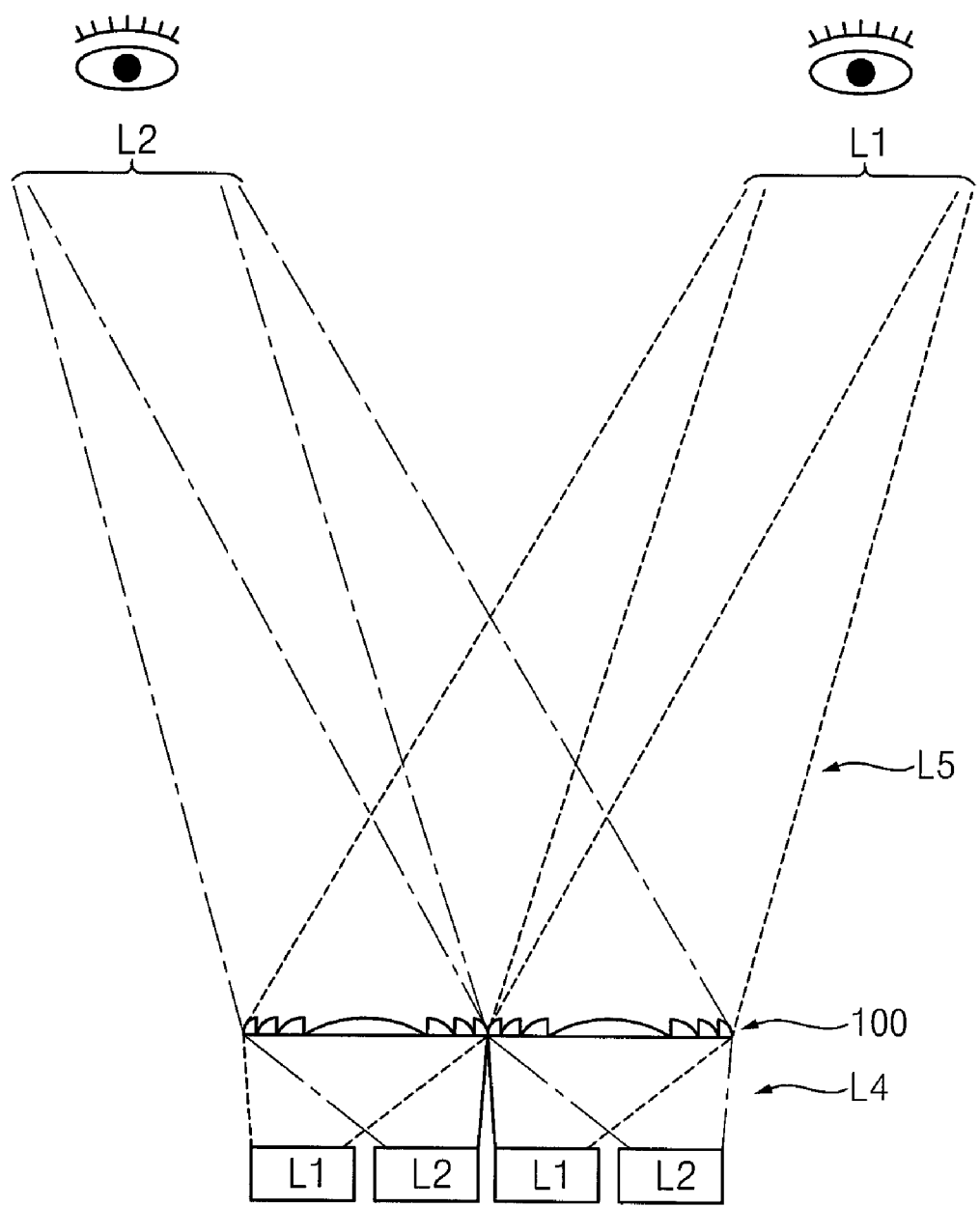
FIG. 11 is a conceptual view illustrating the generation of a stereoscopic image using the stereoscopic image display apparatus in FIG. 10.

FIG. 11 is a conceptual view illustrating display of a stereoscopic image using the stereoscopic image display apparatus shown in FIG. 10.

Referring to FIG. 11, display of a stereoscopic image using a stereoscopic image display apparatus transmitting stereoscopic image light L5 is explained below.

A flat image L4 that has been emitted by the display panel assembly 300 includes a plurality of left images L1 and a plurality of right images L2. Each of the left images L1 and each of the right images L2 are arranged sequentially.

Each of the left images L1 is refracted by unit lenses of the stereoscopic image conversion panel 100 and received by the viewer's left eye. Each of the right images L2 is refracted by the unit lenses of the stereoscopic image conversion panel 100 and received by the viewer's right eye. Therefore, the viewer can see the left images L1 and the right images L2 different from one another, so that the viewer's brain can perceive a three-dimensional effect by synthesizing the left and right images L1, L2.

According to the present example embodiment, since the main lens 132 and the sub-lenses 134 of stereoscopic image lens part 130 are thinner than a conventional concave lens, the thickness of the stereoscopic image conversion panel 100 including the stereoscopic image lens part 132 can be reduced, and thus the thickness of the stereoscopic image display apparatus can also be reduced.

Example Embodiment 2

<Stereoscopic Image Display Apparatus>

Figure 12:
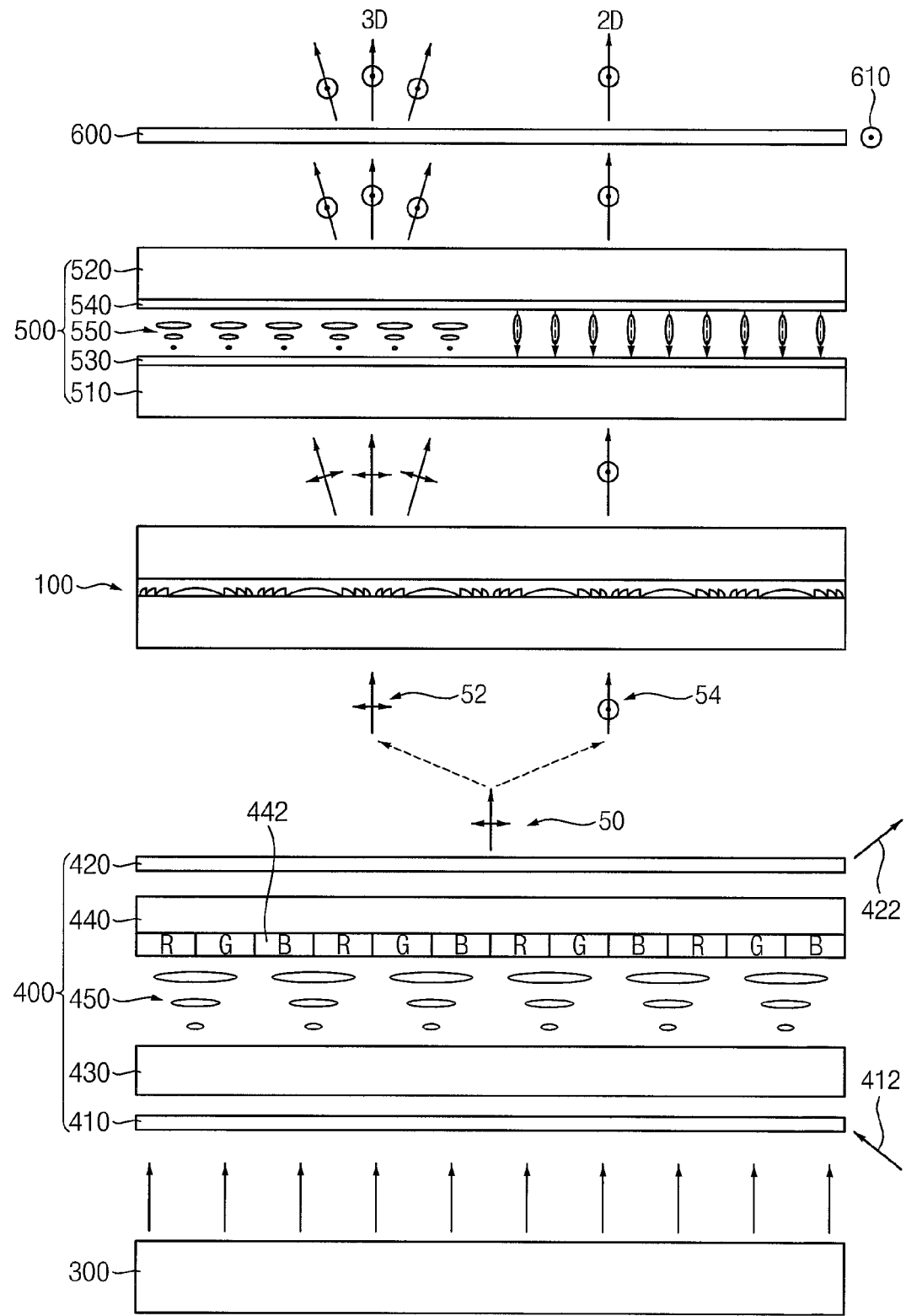
FIG. 12 is a cross-sectional view illustrating a stereoscopic image display apparatus according to a second example embodiment of the present invention.

FIG. 12 is a cross-sectional view illustrating a stereoscopic image display apparatus according to a second example embodiment of the present invention. The stereoscopic image conversion panel in the stereoscopic image display apparatus of the present embodiment is the same as the stereoscopic image conversion panel in Example Embodiment 1. Thus, the same reference numerals will be used to refer to the same or like parts as those described in Example Embodiment 1 of the stereoscopic image conversion panel and further repetitive explanation concerning the above elements may be omitted Referring to FIG. 12, the stereoscopic image display apparatus according to the present example embodiment includes a backlight assembly 300, a display panel assembly 400, a stereoscopic image conversion panel 100, a switching panel 500 and an external polarizing plate 600.

The backlight assembly 300 includes a light source (not shown) to emit light. The display panel assembly 400 is disposed over the backlight assembly 300, and displays a flat image using the light emitted by the backlight assembly 300. The stereoscopic image conversion panel 100 is disposed over the display panel assembly 400, to selectively convert the flat image into a stereoscopic image or to emit the flat image. The switching panel 500 and the external polarizing plate 600 are disposed over the stereoscopic image conversion panel 100, and functions to select one of the flat image or the stereoscopic image.

The display panel assembly 400 includes a first polarizing plate 410, a second polarizing plate 420, and a display panel. The first and second polarizing plates 410 and 420 are disposed to face one another. The display panel is disposed between the first and second polarizing plate 410 and 420, and includes a first substrate 430, a second substrate 440, and a liquid crystal layer 450. In this embodiment, the first polarizing plate 410 has a first polarizing axis 412 and the second polarizing plate 420 has a second polarizing axis 422 perpendicular to the first polarizing axis 412.

The switching panel 500 includes a first switching substrate 510, a second switching substrate 520, a first switching electrode 530, a second switching electrode 540 and a switching liquid crystal layer 550.

In the illustrated embodiment, the first and second switching substrates 510 and 520 have a plate-like shape, include a transparent conductive material, and are positioned facing one another.

The first switching electrode 530 is disposed on the first switching substrate 510 facing the second switching substrate 520, and includes a transparent conductive material. The second switching electrode 540 is disposed on the second switching substrate 520 facing the first switching substrate 510, and includes transparent conductive material. The switching liquid crystal layer 550 is disposed between the first and second switching electrodes 530 and 540. Molecules of layer 550 are rearranged by an electric field generated between the first and second switching electrodes 530 and 540.

In this embodiment, when an electric field is not generated between the first and second switching electrodes 530 and 540, molecules of the switching liquid crystal layer 550 are arranged parallel to the first and second switching substrates 510 and 520 and are twisted into 90 degrees up to an upper portion. However, when an electric field is generated between the first and second switching electrodes 530 and 540, molecules of the switching liquid crystal layer 550 are arranged perpendicular to the first and second switching substrates 510 and 520.

An embodiment of a process that the stereoscopic image display apparatus may use to selectively display one of the flat image and the stereoscopic image is explained as follows.

The light emitted by the backlight assembly 300 is used by the display assembly 400 to generate light to display an image, and is polarized parallel to the second polarizing axis 422.

Light 50 polarized parallel with the second polarizing axis 422 is divided into first light 52 having a first directional element and second light 54 having a second directional element. In this case, the first direction is coincident with an arrangement direction of the lens liquid crystal layer of the stereoscopic image conversion panel 100, and the second direction is perpendicular to the first direction.

First light 52 having the first directional element is refracted in passing through the stereoscopic image conversion panel 100. However, second light 54 having the second directional element just passes through the stereoscopic image conversion panel 100.

When an electric field is not generated in the switching panel 500, the polarization direction of first light 52 that has been refracted in the stereoscopic image conversion panel 100 rotates 90 degrees in passing through the switching panel 500 and as a result is polarized in the second direction. Thus, the first light 52 displays the stereoscopic image upon passing through the external polarizing plate 600. In this case, the second polarizing axis of the external polarizing plate 600 is in the same direction as the second direction.

When the electric field is not generated in the switching panel 500, the polarization direction of second light 54 passing through the stereoscopic image conversion panel 100 rotates 90 degrees in passing through the switching panel 500 and as a result is polarized to have the first direction (perpendicular to the polarizing axis of external polarizing plate 600). Thus, since second light 54 does not pass through the external polarizing plate 600, the flat image is not displayed.

When an electric field is generated in the switching panel 500, first light 52 that has been refracted in the stereoscopic image conversion panel 100 just passes through the switching panel 500. First light 52 passing through the switching panel 500, has a polarization direction perpendicular to the polarization axis of external polarizing plate 600 and thus does not pass through the external polarizing plate 600. As a result, the stereoscopic image is not displayed.

However, when the switching panel 500 has an electric field generated therein, second light 54 just passing through the stereoscopic image conversion panel 100 also passes through the switching panel 500. The second light 54 just passing through the switching panel 500 has a polarization direction along the polarization direction of the external polarizing plate 600 and passes through the external polarizing plate 600. Therefore, the flat image is displayed.

According to embodiments of the present invention, the main lens and the sub-lenses of the stereoscopic image lens part are thinner than a conventional primitive lens, so that the thickness of the stereoscopic image lens part can be reduced.

In addition, the reduced thickness of the main lens and the sub-lenses of the stereoscopic image lens part includes allows for a reduction of the number of liquid crystal molecules received by the main lens and the sub-lenses. Additionally, an alignment groove can be more easily formed on the second alignment film of the stereoscopic image lens part.

Furthermore, as the thickness of the stereoscopic image lens part is reduced, a distance between the first and second transparent electrodes is reduced (in embodiments incorporating first and second transparent electrodes). Therefore, a voltage difference applied between the first and second transparent electrodes for generating a constant electric field can be lowered, and a response speed of the liquid crystal molecules in response to changes in the electric field can also be increased.

Having described the example embodiments of the present invention and some advantages that may be obtained, it is noted that various changes, substitutions and alterations can be made herein without departing from the spirit and scope of the invention as defined by appended claims.

What is claimed is:

1. A stereoscopic image conversion panel comprising:
a first lens substrate;
a second lens substrate facing the first lens substrate;
a stereoscopic image lens part positioned between the first and second substrates, and having a main lens with a concave shape and sub-lenses with one or more concave shapes, at least a first sub-lens being positioned proximate a first edge portion of the main lens and at least a second sub-lens being positioned proximate a second edge portion of the main lens opposite the first edge portion;
a lens liquid crystal layer received by the main lens and the sub-lenses, disposed between the first and second lens substrates, and including liquid crystal molecules having an anisotropic refractive index, to refract light having a first polarization state incident on an interface between the lens liquid crystal layer and the stereoscopic image lens part and to thereby generate a stereoscopic image based on a received flat image; and
a first alignment film including a concave portion, disposed on the stereoscopic image lens part, and configured for arranging at least a portion of the liquid crystal molecules.

2. The stereoscopic image conversion panel of claim 1, wherein a longitudinal cross-sectional surface of the main lens has a concave elliptical segment shape, and that of the sub-lens has a concave saw-like shape comprising a curved portion and a substantially straight portion.

3. The stereoscopic image conversion panel of claim 2, wherein the sub-lenses have a symmetric shape with respect to the main lens.

4. The stereoscopic image conversion panel of claim 3, wherein three sub-lenses are positioned proximate the first edge portion of the main lens along a first direction and three sub-lenses are positioned proximate the second edge portion of the main lens along the first direction.

5. The stereoscopic image conversion panel of claim 2, wherein each of the sub-lenses has an associated height, and wherein the associated heights of each of the sub-lenses is substantially equal.

6. The stereoscopic image conversion panel of claim 5, wherein the main lens has a height, and wherein the height of the main lens is less than or equal to the associated heights of each of the sub-lenses.

7. The stereoscopic image conversion panel of claim 5, wherein the associated heights of each of the sub-lenses is in the range from about 1 μm and about 20 μm.

8. The stereoscopic image conversion panel of claim 2, wherein each of the sub-lenses has an associated width, and wherein the associated width of the sub-lenses decreases with increasing distance from the main lens.

9. The stereoscopic image conversion panel of claim 1, wherein the main lens and the sub-lenses are included in a unit lens, and wherein the stereoscopic image conversion panel includes a plurality of unit lenses disposed along a first direction.

10. The stereoscopic image conversion panel of claim 9, wherein the main lens and the sub-lenses have a shape extending along a second direction perpendicular to the first direction, and the sub-lenses are disposed parallel to the first direction.

11. The stereoscopic image conversion panel of claim 10, wherein a longitudinal arrangement direction of liquid crystal molecules is parallel to the first direction, and light that is polarized in the first direction is refracted at the interface surface between the lens liquid crystal layer and the stereoscopic image lens part.

12. The stereoscopic image conversion panel of claim 1, further comprising:
a first transparent electrode disposed on the first lens substrate facing the stereoscopic image lens part; and
a second transparent electrode disposed on the second lens substrate facing the stereoscopic image lens part,
wherein in response to an electric field generated between the first and second electrodes, the liquid crystal molecules received by the stereoscopic image lens part are positioned to selectively transmit or to refract the light that is polarized in the first direction.

13. The stereoscopic image conversion panel of claim 12, further comprising:
a second alignment film formed on the first transparent electrode and facing the first alignment film.

14. The stereoscopic image conversion panel of claim 13, wherein the stereoscopic image conversion panel is configured so that when the electric field is not generated, a longitudinal arrangement direction of liquid crystal molecules is parallel to the first and second lens substrates due to an interaction between the liquid crystal molecules and the first and second alignment films, and when the electric field is generated, the longitudinal arrangement direction of liquid crystal molecules is perpendicular to the first and second lens substrates due to an interaction between the liquid crystal molecules and the electric field.

15. The stereoscopic image conversion panel of claim 13, wherein when the electric field is not generated, a longitudinal arrangement direction of liquid crystal molecules is perpendicular to the first and second lens substrates due to an interaction between the liquid crystal molecules and the first and second alignment films, and when the electric field is generated, the longitudinal arrangement direction of liquid crystal molecules is parallel to the first and second lens substrates due to an interaction between the liquid crystal molecules and the electric field.

16. The stereoscopic image conversion panel of claim 1, further comprising a transparent electrode formed on the first transparent substrate facing the stereoscopic image lens part,
wherein the stereoscopic image lens part includes a transparent conductive material, and
wherein, in response to an electric field generated between the transparent electrode and the stereoscopic image lens part, the liquid crystal molecules that are received by the stereoscopic image lens part are positioned to selectively transmit or refract the light that has a predetermined polarization direction.

17. The stereoscopic image conversion panel of claim 16, wherein the stereoscopic image lens part includes a conductive polymer.

18. The stereoscopic image conversion panel of claim of 16, further comprising:
a second alignment film formed on the transparent electrode and facing the first alignment film.

19. The stereoscopic image conversion panel of claim 18, wherein when an electric field is not generated, a longitudinal arrangement direction of liquid crystal molecules is parallel to a first direction due to an interaction between the liquid crystal molecules and the first and second alignment films, and wherein in response to the electric field being generated, the longitudinal arrangement direction of liquid crystal molecules is perpendicular to the first direction due to an interaction between the liquid crystal molecules and the electric field.

20. The stereoscopic image conversion panel of claim 18, wherein when an electric field is not generated, a longitudinal arrangement direction of the liquid crystal molecules is perpendicular to a first direction due to an interaction between the liquid crystal molecules and the first and second alignment films, and wherein in response to the electric field being generated, the longitudinal arrangement direction of the liquid crystal molecules is parallel to the first direction due to an interaction between the liquid crystal molecules and the electric field.

* * * * *